C. W. F. STREET.
Cheese-Vats.

No. 166,946.

Patented Aug. 24, 1875.

Attest.
Wm P. Shalding
Edward Barthel.

Inventor.
C. W. F. Street
By Atty
Thos. S. Sprague

UNITED STATES PATENT OFFICE.

CHAUNCEY W. F. STREET, OF LANARK, ILLINOIS.

IMPROVEMENT IN CHEESE-VATS.

Specification forming part of Letters Patent No. 166,946, dated August 24, 1875; application filed June 12, 1875.

*To all whom it may concern:*

Be it known that I, CHAUNCEY W. F. STREET, of Lanark, in the county of Carroll and State of Illinois, have invented an Improvement in Cheese-Vats, of which the following is a specification:

The nature of my invention relates to an improvement in that class of cheese-vats in which the tank is partly submerged in a water-bath heated by live steam, and its object is to so construct the same that the temperature of the water will be uniform in all parts of the vat.

The invention therein consists in a longitudinal partition placed in the bottom of the vat, around which the water is compelled to circulate by the jets issuing from apertures in the sides of the branch pipes, which are perforated in opposite directions on opposite sides of the partition; and, further, in the arrangement of one or more steam-pipes running horizontally above the water-line, and having branches which pass below the water-line and across the bottom of the vat, the said branches having openings adapted to deliver the steam into the water in said vat, all as more fully hereinafter explained.

Figure 1:
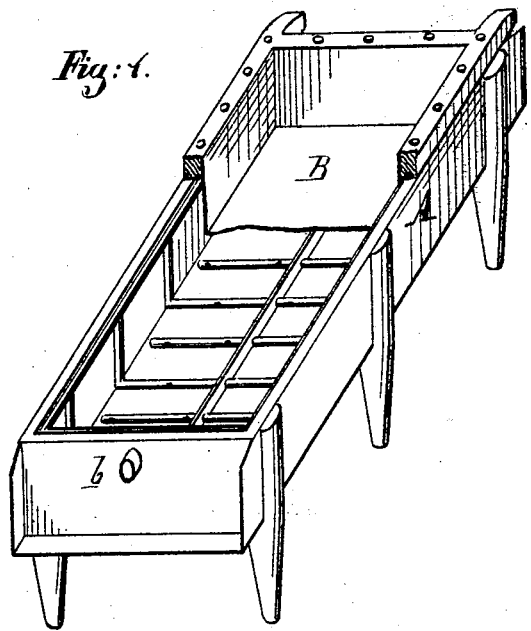
Figure 2:
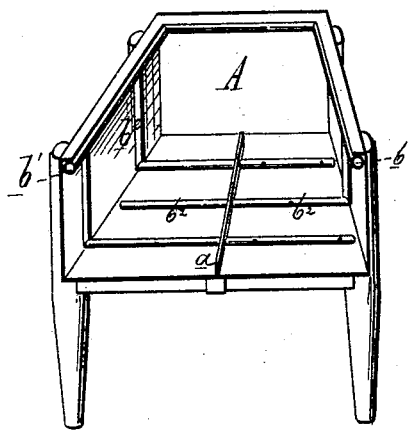
Figure 3:
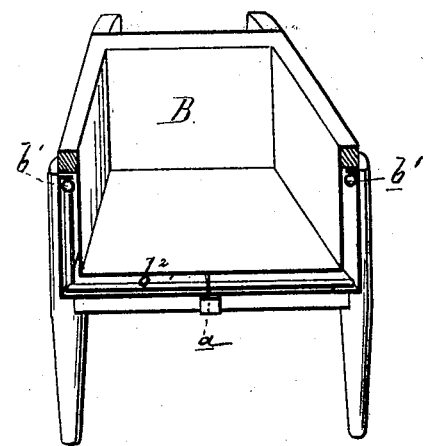

Figure 1 is a perspective view, with a portion of the vat broken away to show the arrangement of the pipes. Fig. 2 is a sectional perspective view of the tank without the vat. Fig. 3 is a similar view of the tank and vat.

In the drawing, A represents a rectangular tank, having in the center of its bottom a low longitudinal partition, $a$, extending nearly its entire length. $b^1$ is a steam-pipe communicating with a generator passing through one end near the top, inside of which it is branched and carried down each longer side above the top of the water standing in the vat, as at $h'$. At regular intervals T's are inserted in the pipes $b^1$, from which branch pipes $b^2$ extend down below the water-line to the bottom of the tank, and across its bottom. The branches of one pipe, $b^1$, alternate with those of the other, and pass through openings in the partition $a$, on one side of which all the pipes are perforated on the side, so as to discharge jets in one direction, while on the other side of the partition they are perforated to discharge jets in the opposite direction, thereby imparting to the water in the tank a continuous circulation around the partition, whereby the temperature of the water is kept at a uniform degree, so essential in the successful manufacture of cheese. B is the vat, suspended in the tank, and in which the milk is coagulated. The height of the water in the tank, or the water-line, varies from about the center of the said tank. The peculiar arrangement of the steam-pipes also produces an equal temperature throughout the vat, the operation of which is as follows:

The steam from the generator passes through the pipe $b$, branches across the end of the vat, and thence in the pipes $b^1$ along the sides of such vat. The steam from the pipes $b^1$ enters each branch, $b^2$, to the water-line, as it reaches said branch in its passage along the sides of the vat. The resistance of the water in the said branch pipes, which are filled through their perforations to the water-line, holds the steam at the water-line C until it has an equal bearing or pressure on the water in every branch pipe, $b^2$. When the pressure becomes the same in all the branches the steam instantly and simultaneously forces the water out of the said branch pipes, and passes itself into the water in said vat in equal quantities, and with an equal pressure throughout the entire vat, thus producing an equal temperature.

What I claim as my invention is—

1. The partition $a$ in the tank A, and in combination therewith the steam-pipes $b^2$, perforated in opposite directions on opposite sides of said partition, substantially as described.

2. The combination, with the tank A, of the horizontal steam-pipes $b\ b^1$, passing along the sides of the vat above the center thereof, and the perforated branch pipes $b^2$, passing below said center and across the bottom of the tank, so as to insure an equal distribution of the steam in said branch pipes, as and for the purpose set forth.

CHAUNCEY W. F. STREET.

Witnesses:
   WM. H. LOTZ,
   GEO. FROMMANN.